(12) United States Patent
Babbar et al.

(10) Patent No.: US 9,411,647 B2
(45) Date of Patent: Aug. 9, 2016

(54) HIERARCHICAL ROUTING AND INTERFACE SELECTION FOR MULTI-PROCESSOR MULTIMODE NETWORK DEVICES

(75) Inventors: Uppinder Singh Babbar, San Diego, CA (US); Venkata Satish Kumar Vangala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 575 days.

(21) Appl. No.: 13/010,773

(22) Filed: Jan. 20, 2011

(65) Prior Publication Data

US 2011/0191484 A1 Aug. 4, 2011

Related U.S. Application Data

(60) Provisional application No. 61/297,338, filed on Jan. 22, 2010.

(51) Int. Cl.
| | |
|---|---|
| G06F 15/16 | (2006.01) |
| G06F 9/50 | (2006.01) |
| H04L 12/66 | (2006.01) |
| H04L 29/06 | (2006.01) |
| H04L 29/08 | (2006.01) |
| H04W 36/18 | (2009.01) |

(Continued)

(52) U.S. Cl.
CPC ............ *G06F 9/5011* (2013.01); *H04L 12/66* (2013.01); *H04L 69/12* (2013.01); *H04L 69/32* (2013.01); *H04W 36/18* (2013.01); *H04W 48/18* (2013.01); *H04W 74/004* (2013.01)

(58) Field of Classification Search
None
See application file for complete search history.

(56) References Cited

U.S. PATENT DOCUMENTS

| | | | | |
|---|---|---|---|---|
| 6,263,379 | B1 * | 7/2001 | Atkinson et al. | 719/332 |
| 6,983,463 | B1 * | 1/2006 | Hunt | 719/316 |
| 7,219,121 | B2 * | 5/2007 | Kaniyar et al. | 709/201 |

(Continued)

FOREIGN PATENT DOCUMENTS

| | | |
|---|---|---|
| EP | 1613108 A1 | 1/2006 |
| JP | H08288333 A | 11/1996 |

(Continued)

OTHER PUBLICATIONS

International Search Report and Written Opinion—PCT/US2011/022045—ISA/EPO—Jul. 21, 2011.

*Primary Examiner* — Azizul Choudhury
(74) *Attorney, Agent, or Firm* — Shirin Tefagh

(57) ABSTRACT

The embodiments simplify the development of applications for current and future wireless communication devices, resolving the deficiencies of current methods by providing a hierarchical routing layer which abstracts the actual proximity of the network connection. An application can request and receive a type of network connection without having to address details of the actual connection established. A hierarchical routing layer is provided within the software architecture of each processor within the computing device. The hierarchical routing layer abstracts the actual proximity of the network connectivity on the modem from the applications using proxy network interfaces. The hierarchical routing layers on each processor cooperate to identify a best network interface for an application network request. The routing layer enables response to an application request for a network interface in a simple manner regardless of whether the network interface is provided on the application host processor or another processor.

53 Claims, 11 Drawing Sheets

(51) Int. Cl.
*H04W 48/18* (2009.01)
*H04W 74/00* (2009.01)

(56) References Cited

U.S. PATENT DOCUMENTS

| | | | |
|---|---|---|---|
| 7,254,639 B1* | 8/2007 | Siegel et al. | 709/238 |
| 7,522,579 B1* | 4/2009 | Mangal et al. | 370/352 |
| 7,688,792 B2 | 3/2010 | Babbar et al. | |
| 8,452,954 B2* | 5/2013 | Strong et al. | 713/151 |
| 2002/0057698 A1* | 5/2002 | Kitai et al. | 370/395.31 |
| 2004/0066759 A1* | 4/2004 | Molteni | H04L 41/048 370/329 |
| 2005/0188070 A1* | 8/2005 | Tripathi et al. | 709/223 |
| 2006/0026268 A1* | 2/2006 | Sanda | G06F 9/5011 709/221 |
| 2006/0274750 A1 | 12/2006 | Babbar et al. | |
| 2007/0173283 A1* | 7/2007 | Livet | H04W 88/06 455/552.1 |
| 2007/0288189 A1* | 12/2007 | Mishuku | 702/117 |
| 2008/0263194 A1* | 10/2008 | Choi et al. | 709/224 |
| 2009/0003263 A1* | 1/2009 | Foster et al. | 370/328 |
| 2010/0184440 A1* | 7/2010 | Mao et al. | 455/437 |
| 2011/0085498 A1* | 4/2011 | Oba et al. | 370/328 |

FOREIGN PATENT DOCUMENTS

| | | |
|---|---|---|
| JP | 2003101245 A | 4/2003 |
| JP | 2006054841 A | 2/2006 |
| JP | 2006072969 A | 3/2006 |
| JP | 2007536581 A | 12/2007 |
| JP | 2008276321 A | 11/2008 |
| WO | WO-03034776 A1 | 4/2003 |
| WO | WO-2006116190 A2 | 11/2006 |

* cited by examiner

HIERARCHICAL ROUTING AND INTERFACE SELECTION FOR MULTI-PROCESSOR MULTIMODE NETWORK DEVICES

RELATED APPLICATIONS

This application claims the benefit of priority to U.S. Provisional Patent Application 61/297,338 entitled "Hierarchical Routing and Interface Selection for Multi-processor Multi-mode Network Devices" filed Jan. 22, 2010, the entire contents of which are hereby incorporated by reference.

FIELD OF INVENTION

The present invention relates generally to the networking in computing devices, and more particularly to methods and devices for selecting network interfaces in multi-processor multimode network devices.

BACKGROUND

Historically, wireless communication devices, such as data cards, cellular telephones, wireless dongles, etc., have been built using a single processor which acts both as a modem and to provide processing power for user interfaces and applications. As a result, there has been no need to select a particular network interface to support an application since the basic architecture provided only a single alternative. However, as network speeds have increased, and as portfolios of applications available for execution on mobile computing devices have expanded, conventional architectures for managing network connections have become inefficient.

Most modern wireless communication devices now feature a separate applications processor. This separate application processor is required to handle the increased central processor unit computing requirements of advanced applications that are becoming increasingly popular for use on mobile multimedia computing devices, such as smart phones. Thus, wireless communication devices featuring an application processor and at least one modem processor are now quite common, such as smart phones, personal digital assistants (PDA), net books, etc.

As new wireless technologies continue to evolve, traditional wireless communication devices are expected to include various types of network technologies in order to support seamless user roaming and mobility across multiple communication networks. Different wireless technologies can be integrated in a number of different ways, including in multi-modem device architectures to enable faster development and product integration. Consequently, wireless communication devices are becoming increasingly complex in terms of number of modem processors and their various interconnections, which complicates the development of applications for use on such devices.

SUMMARY

Embodiments include systems and methods for selecting a network connection for an application within a computing device. Various embodiments include a hierarchical procedure among several processors to select a best network interface in response to a network access request.

Further embodiments include a first or local processor receiving a network access request from an application and forwarding to the network access request to secondary or remote processors via a proxy interface. Each secondary or remote processor may select a network interface that best satisfies the network access request and return information on this network interface to the first processor. The first processor may evaluate its own interfaces and the interfaces selected by any secondary processors to determine a best network interface overall.

Further embodiments involve the secondary processors forwarding the network access request to tertiary processors. Tertiary processors, similar to the secondary processors, may select a network interface that best satisfies the network access request and return information on this network interface to the secondary processor(s). The secondary processors may consider the information returned from the tertiary in the secondary processor's selection process. This hierarchical selection process may be extended through multiple levels of processors.

Further embodiments may involve initiating a network configuration between the local processor and the selected best overall network interface. Connection setup may be initiated by an application or manager, or may be initiated automatically. The resulting data path between the local processor and the selected best network interface may be a chain of interfaces across multiple processors.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any embodiment described herein as "exemplary" is not necessarily to be construed as preferred or advantageous over other embodiments.

As used herein, the terms "mobile device" and "computing device" refer to any one or all of personal computers, laptop computers, cellular telephones, personal data assistants (PDA's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor, memory, and one or more network interfaces.

As new wireless technologies continue to evolve, traditional wireless communication devices are expected to include various types of network technologies in order to support seamless user roaming and mobility across multiple communication networks. Different wireless technologies can be integrated in a number of different ways, including multi-modem device architectures to enable faster development and product integration. Consequently, wireless communication devices are becoming increasingly complex, which complicates the development of applications for use on such devices. Using current application design techniques and software architectures, application developers face a daunting task of keeping track of multiple modem interfaces that can provide an optimum connection for particular application networking requirements. Further, changes to the architecture of the computing device, such as the addition of new communications technologies or modems, may require extensive application rewriting and testing. This is especially true for networking applications which rely on different network technologies to provide a multitude of communication services for applications.

Figure 1:
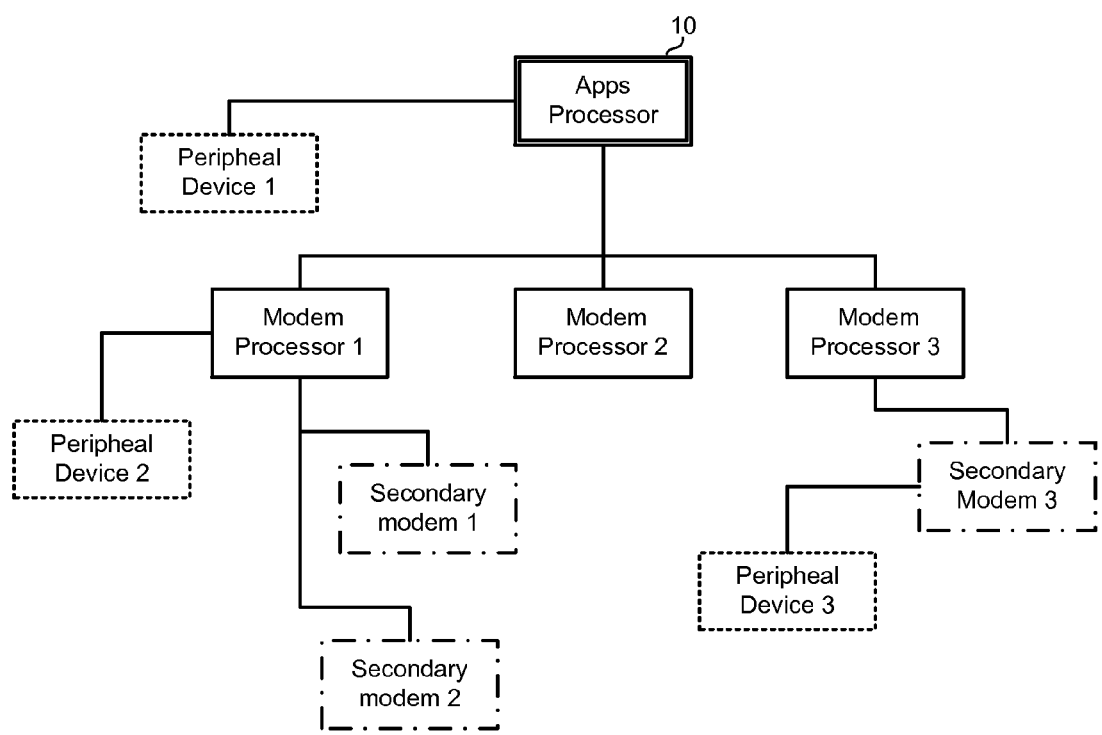
FIG. 1 is a system architecture diagram for a computing architecture suitable for use with the various embodiments.

The complexity that is possible in modern and future computing devices is illustrated in FIG. 1, which shows a computing device architecture including an application processor 10 connected to three modem processors (i.e., modem processors 1, 2, 3). Each of the modem processors 1, 2, 3 may include an internal modem and may be connected to a secondary modem, such as secondary modems 1, 2, 3. A variety of peripheral devices, such as peripheral devices 1, 2, 3, may be connected to the computing device through a variety of connections, such as to the application processor 10 as in the case of peripheral device 1, to a modem processor as in the case of peripheral device 2 connected to modem processor 1, or to secondary modems, such as peripheral device 3 connected to secondary modem 3. Such flexibility in coupling modem processors to the application processor 10 enables a wide variety of different kinds of computer architectures to be constructed. Consequently, application developers cannot anticipate all possible computer architectures that may be implemented for an application requiring network connectivity.

The various embodiments simplify the development of applications for current and future wireless communication devices, resolving the deficiencies of current methods described above, by providing a hierarchical routing layer which abstracts the actual proximity of the network connection. Using the various embodiments, an application can be configured so that it is able to request and receive a particular type of network connection without having to address or otherwise be concerned with the details of the actual connection established or the configuration of the computing device.

In the various embodiments, the hardware architecture and processor topology of the computing device is kept hidden from the applications. From the perspective of an application, an application can access a network connection using the same application programming interfaces (API) and assuming the same interface behavior as with current policy based network access routing methods, such as typical in single modem computing devices. From the perspective of the networking application, the application manages a network interface which connects to a specific network and reads/writes data into sockets associated with that network interface. A hierarchical routing layer is provided within the software architecture of each of the processors within the computing device (i.e., the application processor and the one or more modem processors).

The hierarchical routing layer abstracts the actual proximity of the network connectivity on the modem from the applications using proxy network interfaces. The hierarchical routing layers on each device processor cooperate to identify a best network interface for a particular application network request. The hierarchical routing layer also enables connection of an application request to a network interface in a simple manner regardless of whether the network interface is provided on the application host processor, another processor (e.g., a modem processor), or even on another processor via an intermediary processor.

A "proxy network interface" is an application that is located on the main application processor and represents a real network interface located on another processor. There can be one or more proxy interfaces, each representing a different real interface on a secondary processor. Typically, a proxy interface replicates the same Internet Protocol (IP) configuration and allows the same network operations as supported by the corresponding real network interface.

For ease of reference, the processor on which an application is executing is referred to herein as the "local processor" because the processor is local from the application's perspective. Thus, when a network interface is located on the same processor as the application, the network interface is said to be available on the local processor.

In the various embodiments, when an application requests a connection to a certain network type (e.g., communication network technology), the routing layer on the application processor performs a hierarchical interface selection procedure in order to select the best match interface for the application's needs. This interface selection procedure, which is described more fully below with reference to FIGS. 8 and 9, enables the application processor to return the one interface among a plurality of interfaces available on multiple processors that provides the best match to the application's identified network parameters.

The connection of the application to the selected best interface depends upon whether the selected interface is local or available on another processor. If this network connectivity is directly accessible from the local processor (i.e., the network interface is located on the same processor as the application), a handle to the real network interface is returned to the application. If the network connectivity is accessible from a different processor, i.e., the interface is located on a different processor, a handle to a proxy interface is returned to the application. This proxy interface represents and connects to the same physical network that the application originally requested, although the network connectivity is available on a remote processor. In other words, if the network is connected through a local processor, the application directly connects to the real network interface. However, if the network is connected through a remote processor, the application will connect to a proxy interface. In either case, the application is oblivious to the actual location of the network connectivity, and continues to use the network interface provided to it without necessarily knowing the proximity of the connection.

As is well known, processors may have two types of interfaces, an Rm type interface and an Um type interface. An Um type interface connects to a wireless network, such as a wireless WAN/LAN/MAN network which provides connectivity to the Internet or other local or global service domains. The Rm type interfaces are interfaces that connect to peripheral devices over different types of interconnections. Such Rm type interconnections may be serial wired connections, such as Universal Serial Bus (USB), Serial Peripheral Interface (SPI), Universal Asynchronous Receiver/Transmitter (UART), Secure Digital Input Output (SDIO), etc., serial wireless connections, such as a Bluetooth (BT) interface, or shared memory. The Rm type interface can also be used for other wireless connectivity, such as BT PAN and WiFi. Rm interfaces can be used to extend the network connectivity to a peripheral device, such as Universal Integrated Circuit Cards (UICC), laptops, other co-hosted processors, etc. Each Rm interface connects to a unique Um interface in order to obtain an IP configuration, although multiple Rm interfaces may be served by one Um type interface using Network Address Translation (NAT) or IP routing mechanisms. If an Um type interface is exclusively connected to an Rm type interface, the interfaces can be bridged together for efficient packet forwarding, rather than routing packets through the packet routing module.

Proxy interfaces may connect to Rm interfaces and, hence, pose as a peripheral device to the connecting modem processor. On the other side of the interface, the proxy interface may pose as an Um type interface serving an active and usable IP configuration. These proxy interfaces can be used directly by an application executing on the local processor, or by another peripheral device outside the local processor, such as a laptop or another modem. Hence, it is possible with the various embodiments to build a whole network of processor topology in the computing device. This processor topology can allow any number of peripheral devices to connect to any number of available modem processors in order to access different network technologies. The processor topology also enables any number of modem/application processors to be connected together in serial or parallel fashion. Thus, applications can run on any processor within the computing device (either modem processors or application processor), while having access to wireless networks accessible through remote processors.

Thus, the various embodiments enable applications to request and obtain network interfaces in any of the device architecture configurations shown in FIGS. 2-7 without further complicating application development or requiring the applications to be developed for specific device configurations.

Referring to FIGS. 2-7, the various embodiments may be implemented in the form of a routing layer 22 which is included within the software protocol stack 20 of the application processor and each modem processor within the computing device.

Figure 2:
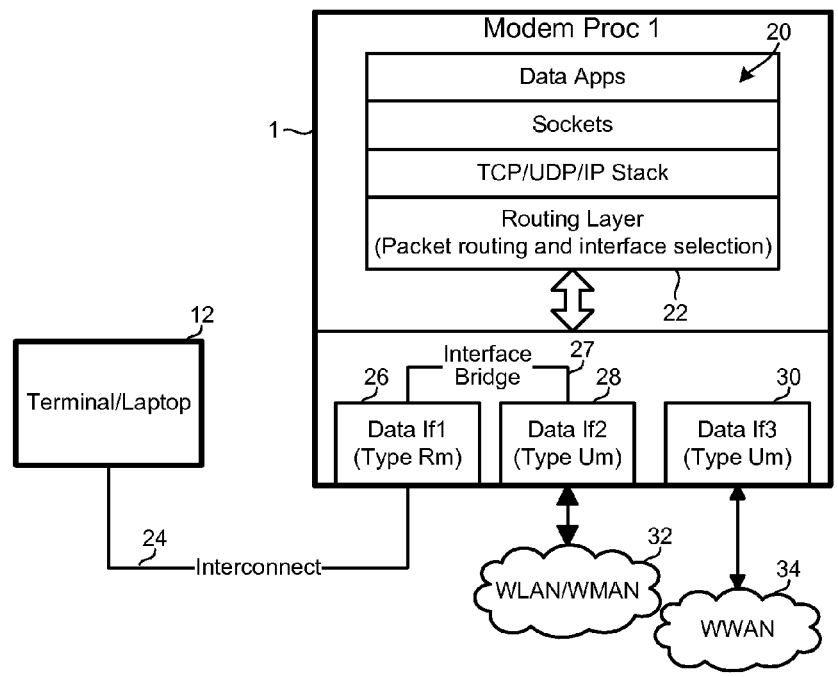
FIGS. 2-7 are system and software architecture diagrams of alternative configurations of computing devices, including an application processor and one or more modem processors suitable for use with the various embodiments.

FIG. 2 illustrates a computer hardware and software architecture for an implementation in which a terminal, such as a laptop computer 12, is coupled to a modem processor 1 by an interconnect 24. In this architecture, the interconnect 24 may be connected to the modem processor 1 via a real (Rm) interface 26 which can provide an interface bridge 27 for coupling to a wireless (Um) interface 28 for accessing a wireless local area network/wireless medium area network (WLAM/WMAN) 32. The modem processor 1 may also include a second wireless (Um) interface 30 for accessing a wireless wide area network (WWAN) 34. The interfaces shown in FIG. 2-7 may be any known signaling or data interface, including USB, SPI, UART, SDIO, BT, shared memory and UICC.

Figure 3:
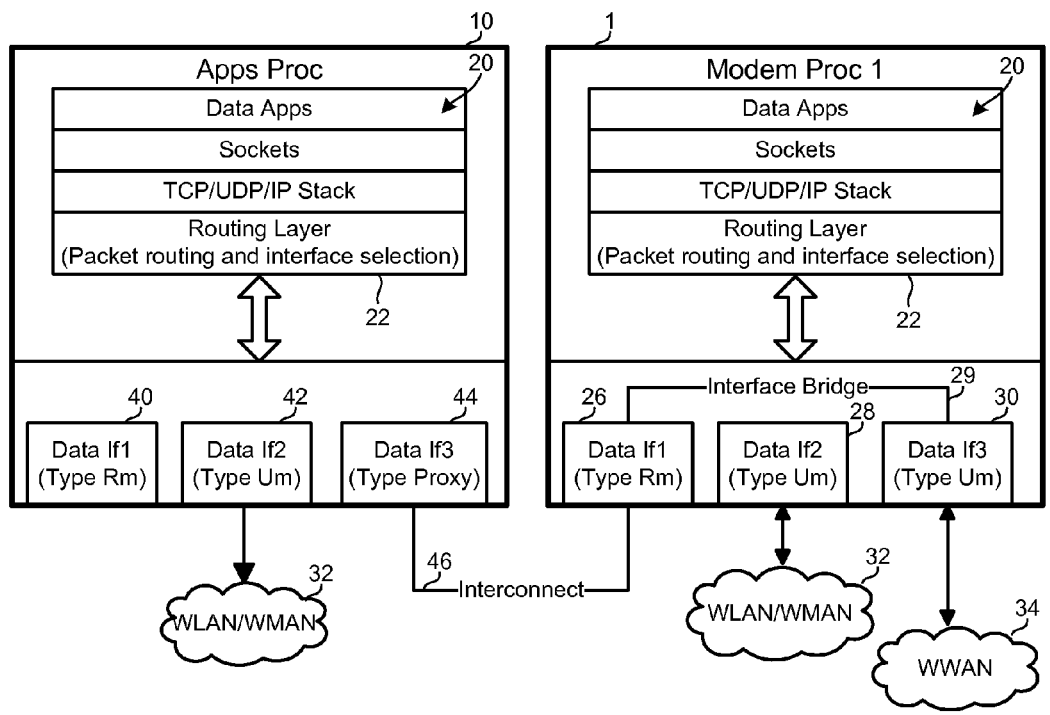

FIG. 3 illustrates a computer hardware and software architecture for an implementation including an applications processor 10 coupled to a modem processor 1. In this implementation the applications processor 10 includes a local real (Rm) interface 40, a wireless interface 42, and a proxy interface 44. The connection with the modem processor 1 is via the proxy interface 44 to the modem processor 1 data interface 26 by an interconnect 46. Data interface 26 may provide an interface bridge 29 to the wireless interface 30.

Figure 4:
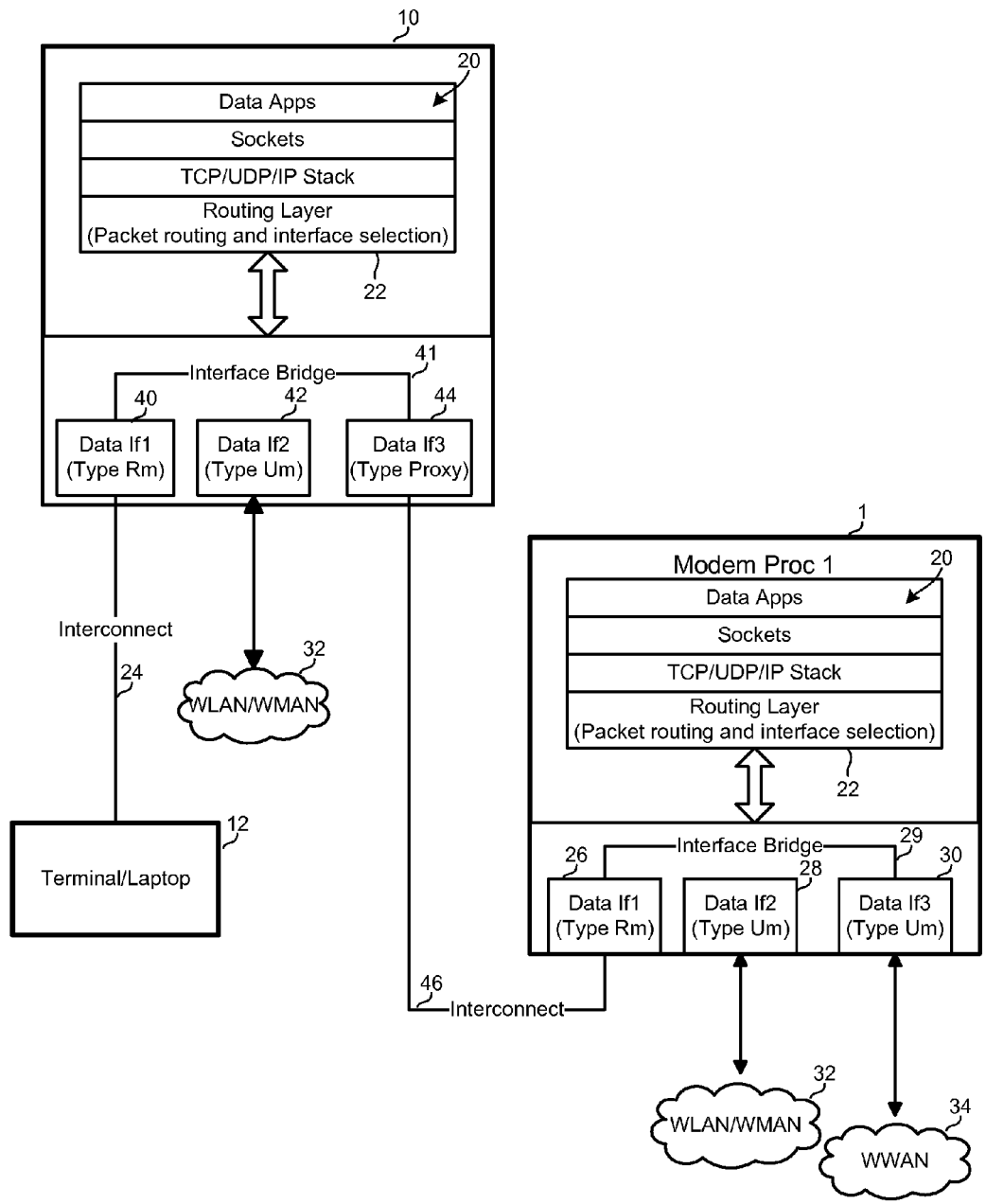
Figure 5:
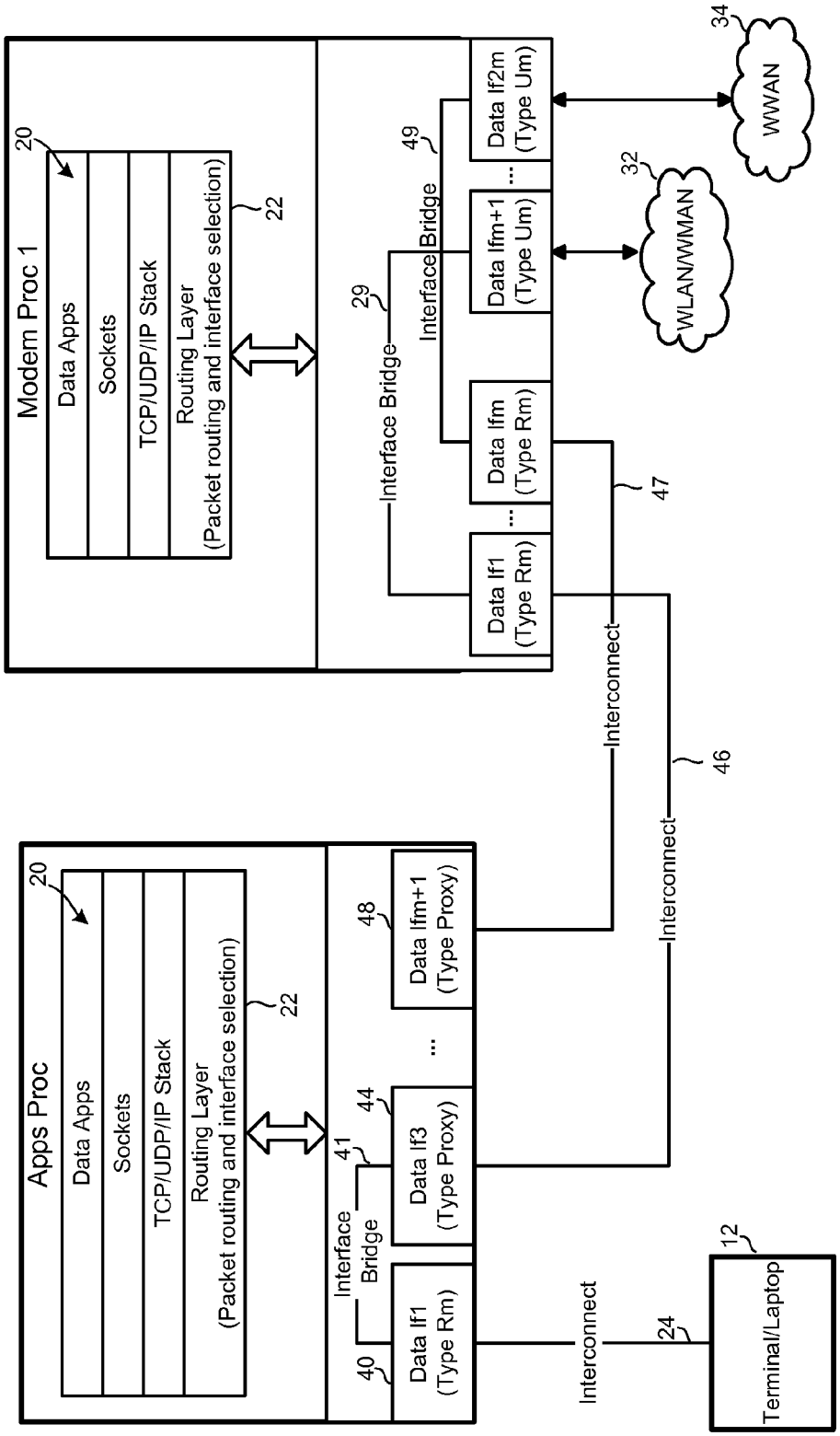

FIG. 4 illustrates a computer hardware and software architecture for an implementation similar to that shown in FIG. 3 with the addition of an interconnect 24 to a laptop computer 12. The interface bridge 41 may connect a real interface 40 to a proxy interface 44. FIG. 5 illustrates a computer hardware and software architecture for an implementation similar to that shown in FIG. 4 in which the modem processor 1 includes multiple interface bridges 29,49 and multiple interconnects 46, 47 to proxy interfaces 44, 48 of the application processor 10.

Figure 6:
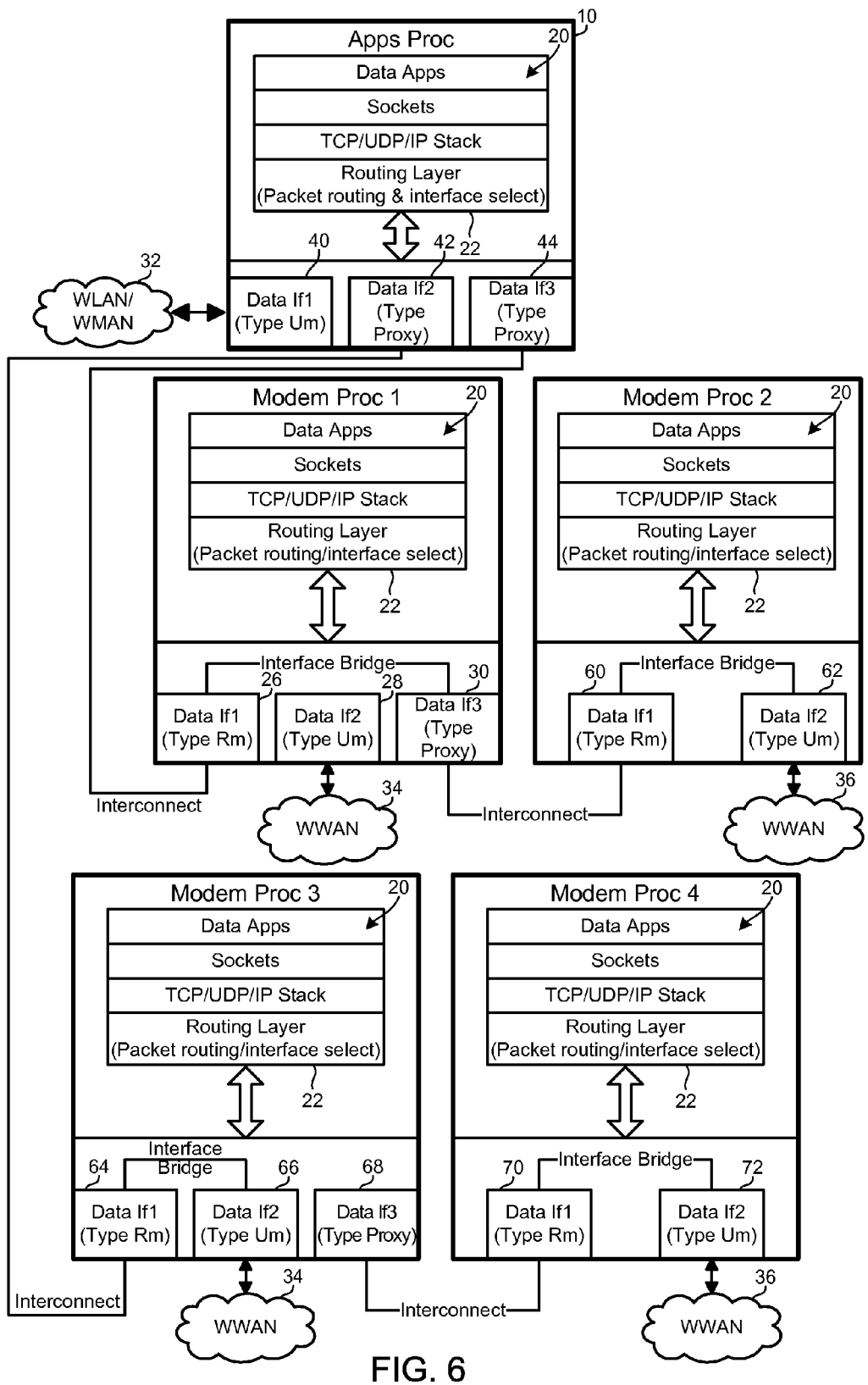

FIG. 6 illustrates a computer hardware and software architecture for an implementation in which the application processor 10 is coupled to four modem processor (i.e., modem processors 1-4). In this architecture, the application processor 10 is directly connected to modem processor 1 and modem processor 3. Modem processor 2 is connected to modem processor 1 via an interconnect, and modem processor 4 is connected to modem processor 3 via an interconnect. Thus, the application processor 10 can only connect with the modem processors 2, 4 via proxy connections through modem processors 1 and 3, respectively.

Figure 7:
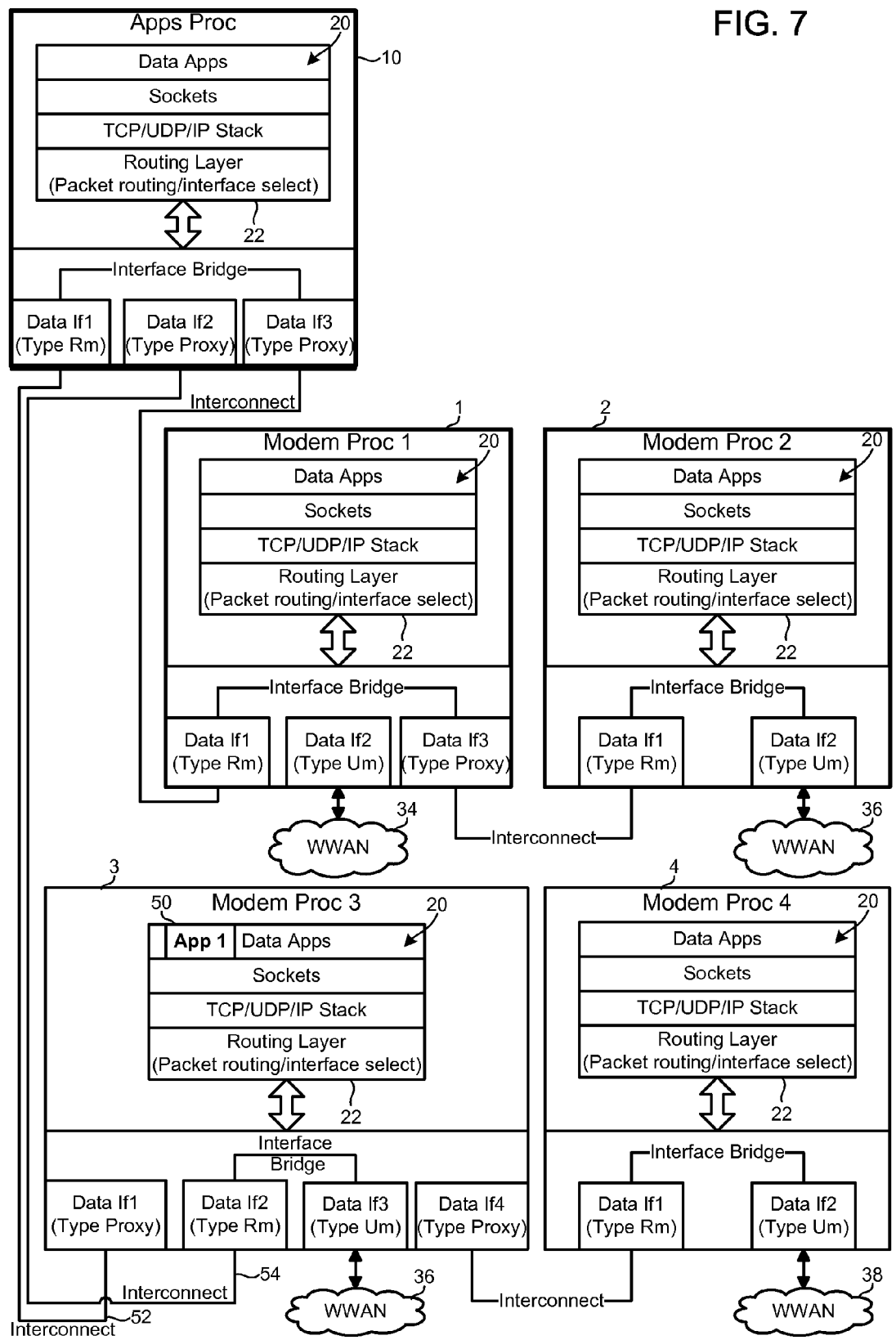

FIG. 7 illustrates a computer hardware and software architecture for implementation that is similar to that illustrated in FIG. 6 with the addition that modem processor 3 includes two connections 52, 54 with the application processor 10. In this implementation, an application ("app 1") 50 is hosted on the modem processor 3. In this configuration, a proxy connection 52 is provided on the modem processor 3 for connecting to an interface provided by the application processor 10.

When an application on a local processor requests a network interface, the routing layer 22 on the local processor may implement a hierarchical routing algorithm to select a particular network interface to be returned to the application. The hierarchical routing algorithm may be implemented in the form of a hierarchical routing module (HRM) within the routing layer of each processor within the computing device. Example operations that may be executed within the hierarchical routing algorithm by an HRM in each of the processor routing layers are illustrated in FIGS. 8A, 8B and 9 which are described below.

Figure 8A:
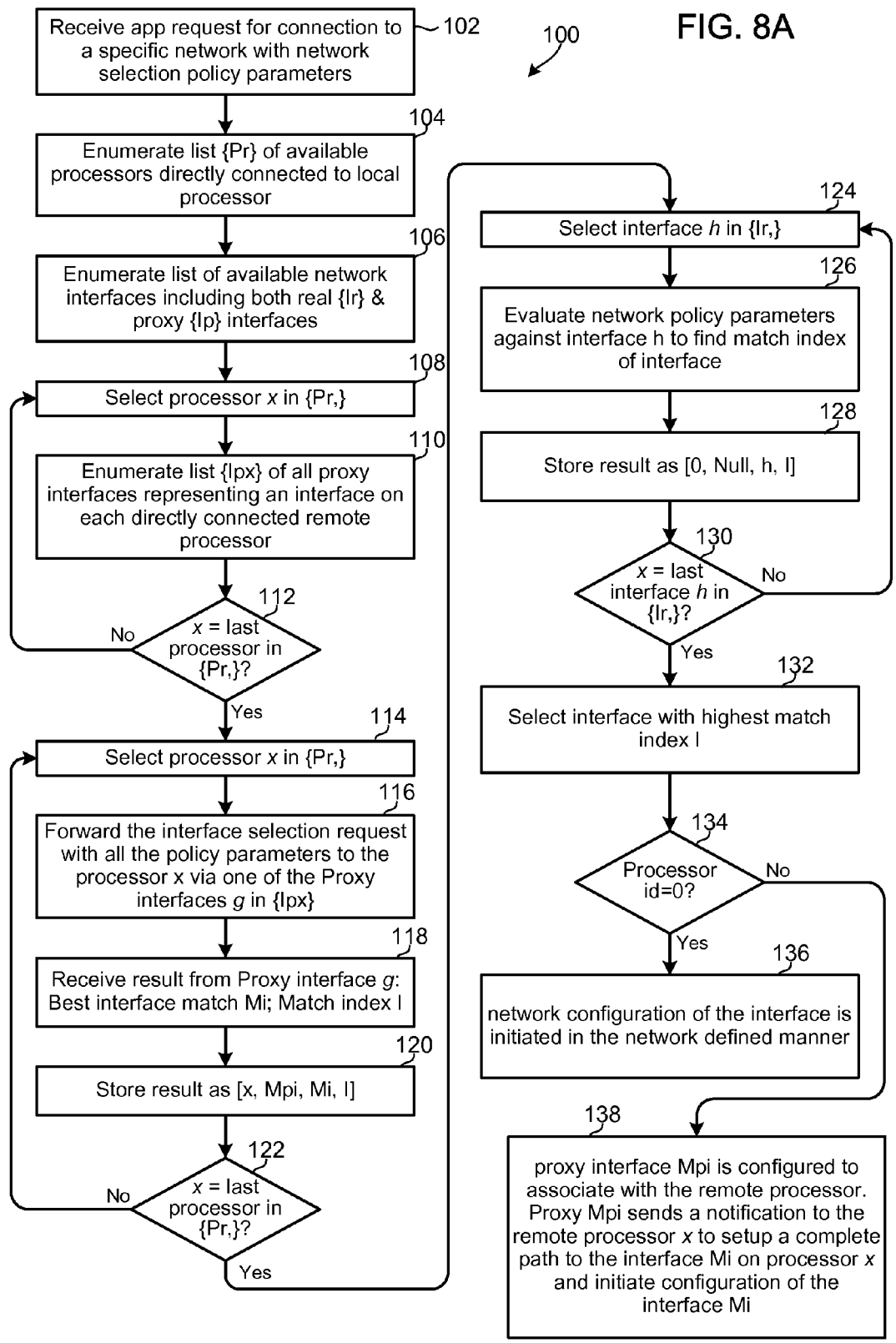
FIG. 8A is a process flow diagram of an embodiment method for selecting a network interface in response to an application interface request.
Figure 8B:
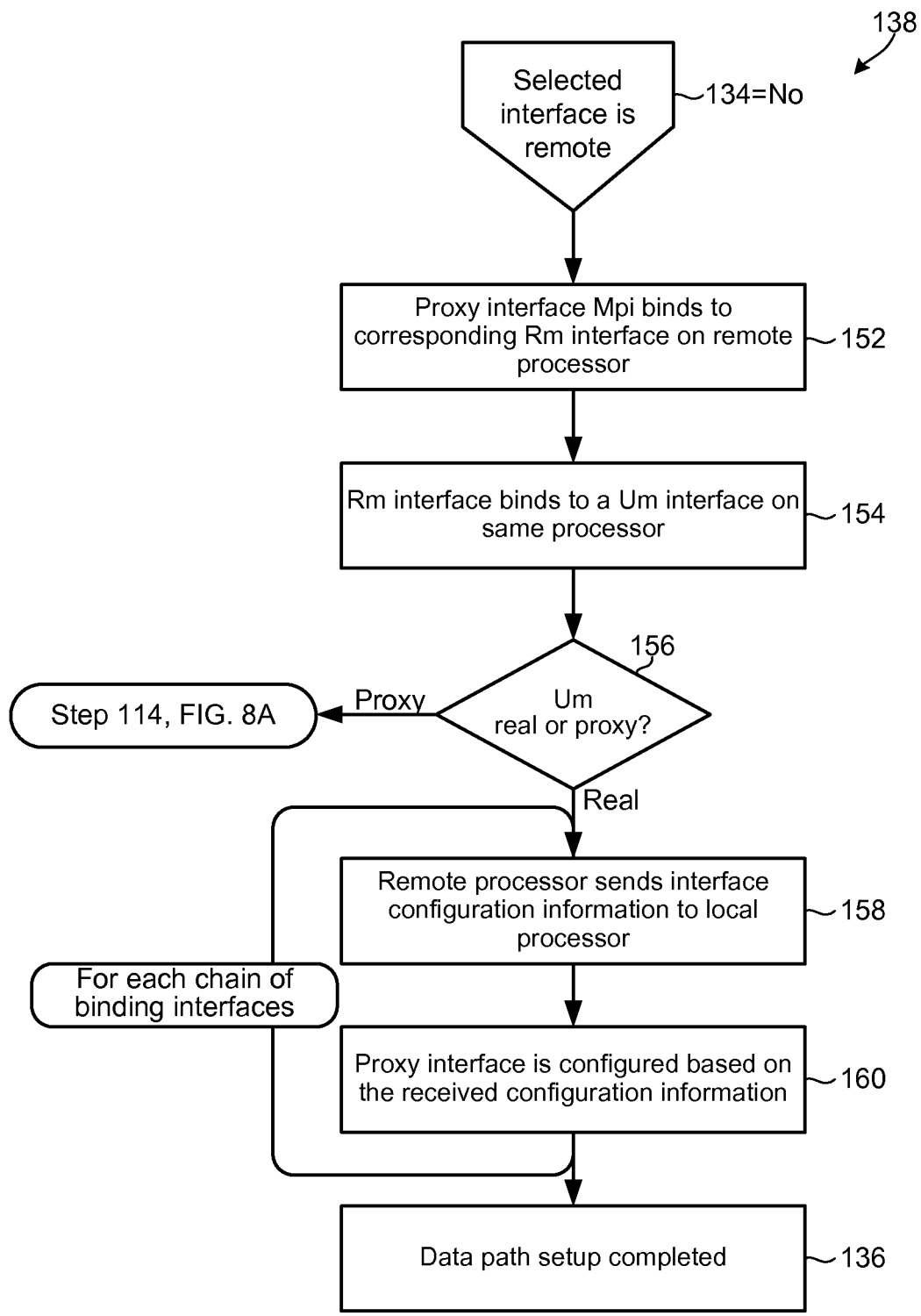
FIG. 8B is a process flow diagram of a portion of the method illustrated in FIG. 8A.
Figure 9:
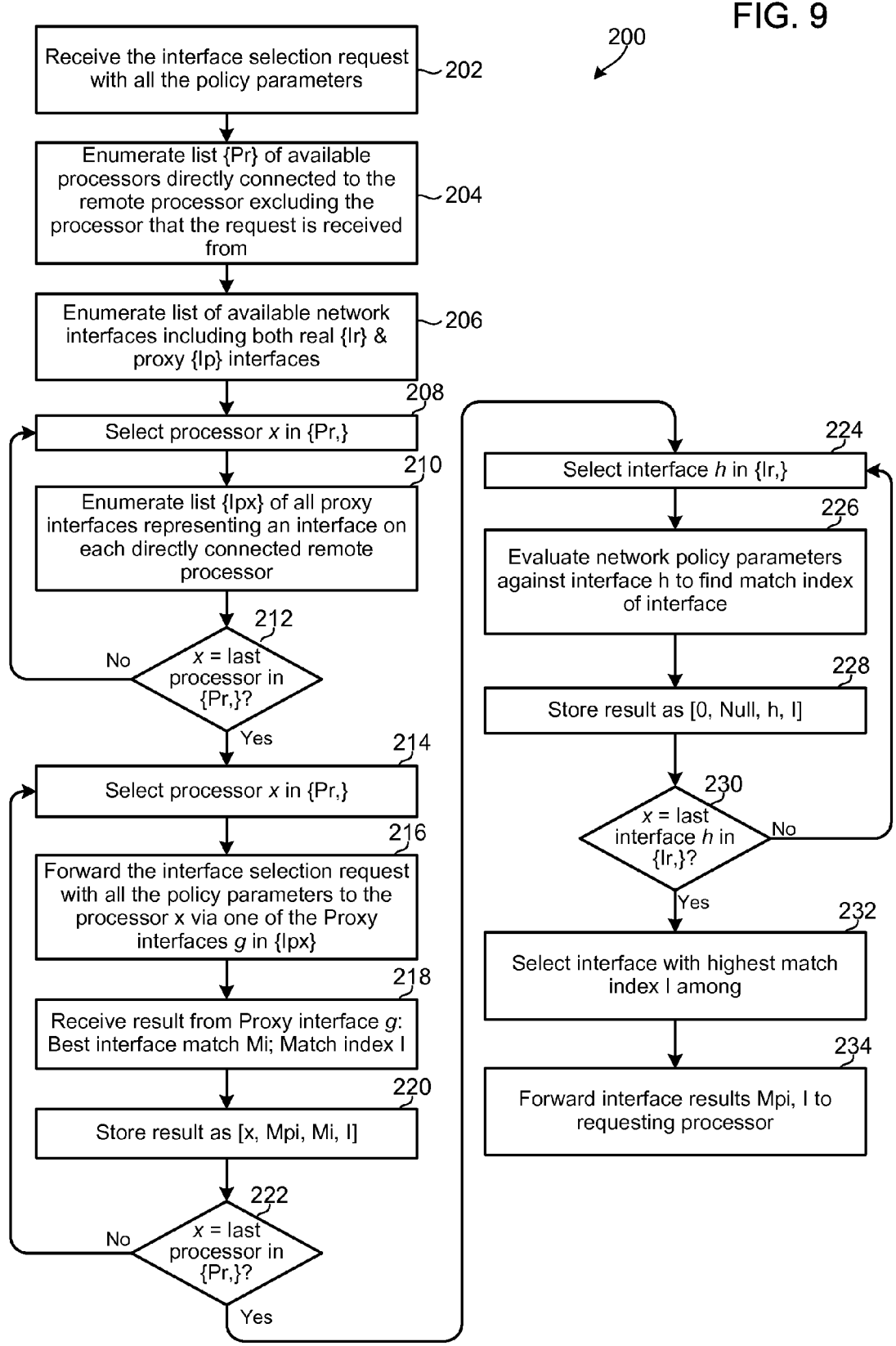
FIG. 9 is a process flow diagram of an embodiment method for responding to network interface information requests from an application processor.

FIG. 8A illustrates an example method 100 of the hierarchical routing algorithm that may be executed within the local processor (i.e., the processor hosting the application requesting the network connection). The processor may initiate the hierarchical routing algorithm in response to receiving an application request for connection to a specific network, step 102. An application's network connection request may include network selection policy parameters, such as technology preference (e.g., cellular, WiFi, Bluetooth, etc.), data rate requirements, quality of service (QOS), desired network capabilities, etc. In step 104, the local processor may evaluate the processor's configurations and enumerate a list {Pr} of available processors that are directly connected to the local processor. In step 106, the local processor may enumerate a list of available network interfaces on the local processor itself. This list may include a list of the real interfaces {Ir} and the proxy interfaces {Ip}. In a loop spanning steps 108 to 112, the local processor may, for each processor x within the list of available processors {Pr}, enumerate a list of all proxy interfaces representing an interface on each directly connected remote processor, referred to as {Ipx}. In other words, in step 108, the local processor may select a particular one (x) of the available directly connected processors for evaluation, enumerate a list {Ipx} for that processor of all proxy interfaces representing an interface in step 110, and repeat these operations until the last processor x has been evaluated (i.e. until determination step 112="Yes").

In a loop spanning steps 114 to 122, the local processor may obtain network interface suitability information from each connected processor that can be used to select a best interface for the application. Specifically, in step 114, the local processor may select one (x) of the available directly connected processors for evaluation. In step 116, the local processor may forward the interface selection request, including all of the network selection policy parameters, to the selected processor x via one (g) of the proxy interfaces in {Ipx}. The selected proxy interface may be any interface that is currently available (i.e., the proxy interface may be randomly selected from the set {Ipx}). If there are no processors coupled to the local processor, (i.e., the list of available processors {Pr} is a null set), steps 116 and 118 will be skipped. In step 118, the local processor will receive back from the selected processor x information regarding the interface best matching the network selection policy parameters available on that processor. This information may include: a best match interface Mi which is an interface identifier that is mapped to the corresponding proxy interface Mpi (which is one of the interfaces among the set {Ipx}); and a match index I, which may be an integer value indicating how well the network interface can support the requested network policy. In an embodiment, the better the identified network interface matches the network selection policy parameters, the higher the value of the match index I. Providing a match index value facilitates identifying an available network interface among a plurality of network interfaces available through a plurality of modem processors that best matches the application's network policy parameters under the existing network conditions.

The information reported back to the local processor in step 118 may be generated by the selected processor x in a similar routing layer routing algorithm, as described below with reference to FIG. 9. The information reported back to the local processor step 118 may be stored by the local processor routing layer as a four-tupple [x, Mpi, Mi, I] in step 120. This four-tupple [x, Mpi, Mi, I] value indicates that the selected processor x can provide the desired network connectivity via proxy interface Mpi with a match index I, and that the interface Mi on the remote processor x will be used to provide this connectivity.

In determination step 122, the local processor determines whether the selected processor is the last processor within the list {Pr}. If there is another processor to evaluate (i.e., determination step 122="No"), the processor may return to step 114 to select the next processor x within the list {Pr}.

If all processors have been evaluated (i.e., determination step 122="Yes"), the processor may evaluate each real interface (i.e., the interfaces available in the local processor in list {Ir}) in a loop spanning steps 124 to 130. Specifically, in step 124, the local processor may select one (h) interface within the list {Ir} of real interfaces connected to the local processor. In step 126, the network selection policy parameters are evaluated against the selected interface h characteristics to determine a match index I value for the selected interface. The evaluation of local interfaces against the desired network capabilities and network policy parameters can be accomplished using any of a variety of methods well known to one of skill in the art. Information regarding the degree to which a local interface satisfies the interface selection request may be stored in a four-tupple [0, Null, h, I] value. This four-tupple [0, Null, h, I] indicates that the local processor (indicated by the value "0") can support the desired network connectivity with a real interface h that has a match index value of I. In determination step 130, the local processor determines whether the selected local interface h is the last local interface within the list {Ir}. If there is another local interface to evaluate (i.e., determination step 130="No"), the processor may return to step 124 to select the next local interface h within the list {Ir}.

If all local interfaces have been evaluated (i.e., determination step 130="Yes"), local processor evaluates the stored four-tupple values to identify the interface with the highest match index I which is selected for use in step 132. Information within the four-tupple of the selected interface is recalled from memory as part of step 132.

In determination step 134, the local processor determines whether the selected interface is a remote or local interface, such as by determining whether the processor ID (i.e., the first value in the four-tupple) is equal to "0" which indicates that the selected interface is local. If the selected interface is a local interface (i.e., determination step 134="Yes"), the network configuration of the selected interface is initiated in the network defined manner in step 136.

If the selected interface is a remote interface (i.e., determination step 134="No" and the processor ID is a value other than "0"), the proxy interface Mpi is configured to associate with the remote processor in step 138. This configuration of the proxy interface Mpi may be accomplished by configuring the proxy interface and establishing a connection to the selected interface of the remote processor (i.e. the remote modem).

Various embodiments may implement different methods for initiating the connection setup between the proxy interface Mpi and the selected interface Mi in step 138. In a first method, an application or connection manager may initiate the connection setup. Based on a selected interface Mi returned by the hierarchical routing module (HRM), the application or connection manager may issue a network connect request. Configuration of the interface may happen as part of this process. In a second method, the connection setup may occur automatically as soon as the best match interface is available or based on another triggering event. Configuration of the interface then happens after that.

In both cases, the connection setup and configuration process may proceed in step 138 as further illustrated in FIG. 8B. After a connection setup has begun, the interface on the remote processor corresponding to the proxy interface Mpi may be configured by the proxy interface Mpi binding to a corresponding Rm interface on the remote processor in step 152. In step 154, this Rm interface binds to a Um interface on the same remote processor, which may be a real interface or another proxy interface. If the Um interface is real (i.e., determination step 156="Real") the remote processor may send the interface configuration information to the local processor in step 158, and the proxy interface Mpi on the local processor may be configured based upon configuration information sent to the local processor by the remote processor in step 160. This will complete the network connection setup, step 136.

As illustrated in FIG. 8B, this configuration process may be hierarchical and repeated along a chain of multiple connected processors. Thus, if the proxy interface Mpi binds to a proxy Um interface (i.e., determination step 156="Proxy") the process may be repeated by returning to step 114 in FIG. 8A to select the next interface to the next processor x. The selected interface may then be bound in this manner with the proxy Um interface (i.e., the corresponding Rm interface of another remote processor) binding to another Um interface by repeating steps 152 through 156. This chain of binding interfaces may continue until a real Um interface is reached that may provide connectivity to a real physical network and thus complete the data path setup. Once a real Um interface is bound (i.e., determination step 156="Real") each remote processor may send the interface configuration information to the preceding "local" processor in step 158, and the proxy interface Mpi on the local processor may be configured based upon configuration information in step 160, with the process of sending of interface configuration information and configuring each proxy interface continuing until all proxy interfaces in the chain of interfaces have been configured. This will complete the network connection setup, step 136. Thereafter, all packets transmitted from an application may travel through the chain of interfaces established in this data path.

The same basic hierarchical routing algorithm may be implemented on each processor in a routing layer. This embodiment will support an arbitrary network of processors connected to together in a computer architecture and allow applications running on any one of the processors to access any network via any modem. Thus, when a network selection request is forwarded to the next processor in step 114, the same basic algorithm is executed again over the set of local and proxy interfaces on that next (i.e. remote) processor. The interface selection request will arrive over an Rm link connected to the proxy interface g. The Rm interface will forward the request to the routing layer and invoke the hierarchical routing algorithm. From the Rm interface perspective, this process is how the interface supports peripheral connectivity in single modem devices (e.g., FIG. 2) or dual processor devices (e.g., FIG. 3). As the same routing interface selection algorithm is repeated on each processor, the network interface can proceed in a recursive manner (or other tree traversal method) from processor to processor through the computing device architecture.

Since applications may run on any processor within a computing device architecture, such as the computer architectures illustrated in FIGS. 2-7, the various embodiments may be implemented using routing layers that implement the same basic process of selecting a best network interface regardless of whether the request for the interface is received from a local application or from a connected processor (i.e., regardless of whether the processor is a local processor or a connected processor). This is illustrated in FIG. 9 which shows an example method 200 which may be implemented on a remote processor x to respond to the interface selection request forwarded by the local processor in step 116 described above.

Referring to FIG. 9, in response to receiving the interface selection request with policy parameters in step 202, the remote processor may evaluate the processor's configurations and enumerate a list {Pr} of available processors that are directly connected to the remote processor in step 204. This list of processors available to the remote processor will not include the processor from which the interface selection request was received. In step 206, the remote processor may enumerate a list of available network interfaces on the remote processor. This list may include a list of the real interfaces {Ir} and the proxy interfaces {Ip} available on the remote processor. In a loop spanning steps 208 to 212, the remote processor may, for each processor x within the list of available processors {Pr}, enumerate a list of all proxy interfaces representing an interface on each directly connected (i.e., doubly remote) processor, referred to as {Ipx}. In other words, in step 208, the remote processor may select a particular one (x) of the available directly connected doubly remote processors for evaluation, enumerate a list {Ipx} for that processor of all proxy interfaces representing an interface in step 210, and repeat these operations until the last doubly remote processor x has been evaluated (i.e. determination step 212="Yes").

In a loop spanning steps 214 to 222, the remote processor may obtain network interface suitability information from each connected doubly remote processor that can be used to select a best interface for responding to the interface selection request. Specifically, in step 214, the remote processor may select one (x) of the available directly connected doubly remote processors for evaluation for receiving interface suitability information. In step 216, the remote processor may forward the interface selection request, including all of the network selection policy parameters, to the selected doubly remote processor x via one (g) of the proxy interfaces in {Ipx}. The selected proxy interface may be any interface that is currently available (i.e., the proxy interface may be randomly selected from the set {Ipx}). If there are no doubly remote processors coupled to the remote processor, i.e., the list of available processors {Pr} is a null set, step 216 will be skipped. In step 218, the remote processor will receive back from the selected doubly remote processor x information regarding the interface best matching the network selection policy parameters available on that processor. This information may include: a best match interface Mi which is an interface identifier that is mapped to the corresponding proxy interface Mpi (which is one of the interfaces among the set {Ipx}); and a match index I, which may be an integer value indicating how well the network interface can support the requested network policy. The information reported back to the remote processor step 218 may be stored by the remote processor routing layer as a four-tupple [x, Mpi, Mi, I] in step 220. In determination step 222, the remote processor determines whether the selected doubly remote processor is the last processor within the list {Pr}. If there is another doubly remote processor to evaluate (i.e., determination step 222="No"), the processor may return to step 214 to select the next processor x within the list {Pr}.

If all doubly remote processors have been evaluated (i.e., determination step 222="Yes"), the remote processor may evaluate each real interface (i.e., the interfaces available in the remote processor in list {Ir}) in a loop spanning steps 224 to 230. Specifically, in step 224, the remote processor may select one (h) interface within the list {Ir} of real interfaces connected to the remote processor. In step 226, the network selection policy parameters are evaluated against the selected interface h characteristics to determine a match index I value for the selected interface. The evaluation of local interfaces against the desired network capabilities and network policy parameters can be accomplished using any of a variety of methods well known to one of skill in the art. Information regarding how well a local interface satisfies the interface selection request may be stored in a four-tupple [0, Null, h, I] value. This four-tupple [0, Null, h, I] indicates that the remote processor (indicated by the value "0") can support the desired network connectivity with a real interface h that as a match index value of I.

In determination step 230, the remote processor determines whether the selected local interface h is the last local interface within the list {Ir}. If there is another local interface to evaluate (i.e., determination step 230="No"), the remote processor may return to step 224 to select the next local interface h within the list {Ir}.

When all local interfaces have been evaluated (i.e., determination step 230="Yes"), the remote processor evaluates the stored four-tupple values to identify the interface with the highest match index I which is selected in step 232. In step 234, the remote processor returns to the local processor (i.e., the processor that issued the interface selection request) the interface selection information, including the proxy interface identifier Mpi and the interface match index I. If the selected interface is local (i.e., on the remote processor), the interface identifier h is returned as the proxy interface identifier Mpi.

By implementing the various embodiments in a distributed hierarchical decision making architecture using similar routing layer modules on all processor within or connected to the computing device as described above, the various embodiments can be employed with computing devices that have any number of different layers of processors. Further, applications written for one computing device architecture may be implemented on computing devices with much more complex multiprocessor architectures without the need for changes to the code or testing for configuration compatibility. Additionally, the various embodiments operate the same regardless of which processor hosts the application which issues the network connection request.

The various embodiment procedures are hierarchical and can span all processors within a computer's architecture. In general, the hierarchical routing algorithm allows for the device topology to be represented as a tree like structure as illustrated in FIG. 1 to include any level of complexity, while allowing the process to function correctly. The foregoing embodiment descriptions presume an implementation in which the polling of processors proceeds in a sequential manner, moving from interface to interface, and from coupled processor to coupled processor. However, this is but one example of how processors may be queried, and any number of other methods may be used. For example, the interface selection request may be issued by the local processor to all attached processors in parallel so that the attached processors may perform their own evaluation of available interfaces in parallel and report back results when complete. In another embodiment that may be suitable for complex computer architectures, such as illustrated in FIGS. 6 and 7, the hierarchical routing algorithm can be implemented using one of several tree traversal algorithms without diverting from the basic procedure described herein.

The various embodiments support implementations in which applications may be running on various modem processors, and not on a main application processor. This may occur for a number of reasons. For one, an application may have been developed and tested for a specific modem processor which is now connected to an application processor. When other processors have been added over time to support additional network connectivity, enabling the application to continue to run on the specific modem processor may avoid the need to reintegrate existing applications on new processor environments. Additionally, specific radio functionality may be only available on certain modem processors, or the more optimally accessible through a particular modem processor. Further, system applications that need to run on the modem processor for interface management and configuration may be hosted on the modem's processor rather than the application processor.

In certain scenarios, applications running on modem processors may desire to use radio connectivity provided by other modem processors. The hierarchical routing algorithms of the various embodiments can be used to solve such scenarios. As shown in FIG. 7, an application 50 ("app 1") operating on modem processor 3 may desire to use a wireless network connected through modem processor 2. In this example, there is no direct connection between modem processor 3 and modem processor 2. In order to provide the requested network access to app 1, another proxy interfaces may be added which connects back to the applications processor. Beyond that, the connection may be set up in the same way that a peripheral device connects to the application processor. As long as all of the modem processors in the system are uniquely indexed, the hierarchical routing algorithm can be executed without modification in order to find a suitable interface for the application 50 even though it is operating on modem processor 3.

By implementing the embodiments in a hierarchical decision-making architecture, each processor within the computing device can make its own determination of a local best connected interface for the requested network connection, and relay its local best connection characteristics to the application making the request or processor forwarding the request (i.e., the next higher layer processor). This distributed decision-making may be explained by way of an example with reference to FIG. 6. In the computer architecture illustrated in FIG. 6, the application processor 10 is coupled to two modem processors (i.e., modem processor 1 and modem processor 3), each of which is connected to another modem processor (i.e., modem processor 1 is connected to modem processor 2, and modem processor 3 is connected to modem processor 4). Implementing the hierarchical routing algorithm on each processor results in forwarding the interface selection request parameters to each processor so that each can identify its best available interface. Thus, in response to an interface selection request, modem processor 2 may identify to modem processor 1 that Um interface 62 can satisfy the interface request for accessing WWAN 36 with a particular match index value I. In turn, modem processor 1 will evaluate its own local Um interface 28 for accessing WWAN 34 to determine its match index value I and compare that value to the received match index I for interface 62 on modem processor 2 in order to select the better of the two interfaces for reporting to the application processor 10. Similarly, the modem processor 4 will provide a match index value I for interface 72 for accessing WWAN 36 to modem processor 3 which will select the better of its local interface 66 and proxy interface 72 to report to the applications processor 10. Thus, the application processor 10 may select a best interface in response to an application request from among the match index I received from modem processor 1 via proxy interface 44, the match index I received from modem processor 3 via proxy interface 42, and local interface 40.

The configuration and setup of a data path may also follow a hierarchical approach. For example, again with reference to FIG. 6, if Um interface 62 of modem processor 2 has been selected as the best interface in response to an application request from application processor 10, the connection setup and configuration operations may begin. The connection setup operation may be initiated by an application or automatically, but either way the proxy interface 44 and its corresponding Rm interface 26 may be configured based on information sent between the application processor and modem processor 1. The configuration process may be repeated down a chain of interfaces to establish a data path to the selected Um interface 62. Thus, the proxy interface 44 may bind with the Rm interface 26, which may in turn bind with interface 30. Because interface 30 is a proxy and not a real interface, interface 30 may bind with the Rm interface 60, which may bind with the selected Um interface 62. The selected Um interface 62 may provide the connection to the real physical network, and thereby complete the data path.

Additionally, interface chains may be established in a similar manner in a reverse direction from one requesting processor to another processor having a real interface to a desired network or resource. Thus, a second processor in one chain of interfaces may establish a proxy interface connection with a third processor that may already have a different proxy interface connection established with the second processor as part of a second chain of interfaces. In such a situation both proxy interface connections between the second and third processors may be established using the same operations as described above with reference to FIGS. 8A, 8B and 9, with each chain of interfaces initiated by a different initiating processor specifying similar or different network selection policy parameters.

The embodiments can be applied to a vast array of computing architectures and application scenarios, and thus are not limited to the foregoing descriptions of example embodiments. Further, the number of proxy interfaces and real (Rm) interfaces that need to be supported in each processor will vary from system to system, and can be statically or dynamically configured. In one embodiment, a static configuration table may be input to the modem during the boot-up process, and the modem processor can create a desired number of interfaces based on such configuration information. In an alternative embodiment, Rm interfaces can be created on an as-needed basis dynamically. Proxy and Um interfaces are typically created up front to represent all of the possible connectivity options available in the particular computer device.

Even though applications are oblivious to the proximity the network connections, applications may observe additional delays if the connections span multiple processors. To accommodate this, embodiments may minimize the impact by reducing the inter-processor communication delays as much as possible.

To support the various embodiments, a signaling mechanism or signaling channel is required to support communication between the various hierarchical routing modules or routing layers of the different processors for transmitting interface selection request and receiving back the results. Any suitable signaling mechanism or signaling channel can be used for this purpose, such as the QMI messaging protocol. It should be noted that the signaling mechanism may be accomplished over the same physical interconnect, with signaling occurring via the signaling mechanism and data transmissions via IP traffic, as is provided in USB interfaces.

The various embodiment procedures described herein should function irrespective of the types of interconnections used between different processors, which can vary within the same computing device. Thus, the embodiments are not tied or limited to any particular computing architecture, inter-processor communication protocol or connection, or wireless communication technology.

In a further embodiment, the best interface selection decision or interface match index values and four-tupples may be stored in memory of the application processor 10 in order to support subsequent application network access requests. This embodiment may be useful to save processing time when no changes to device configuration, network characteristics or network selection policy parameters have occurred since a last time the hierarchical routing algorithm was accomplished. In this embodiment, the application processor may compare the network selection policy parameters to parameters from a previously completed network selection to determine if they are the same, and configure a network connection according to a stored selected interface configuration information.

Figure 10:
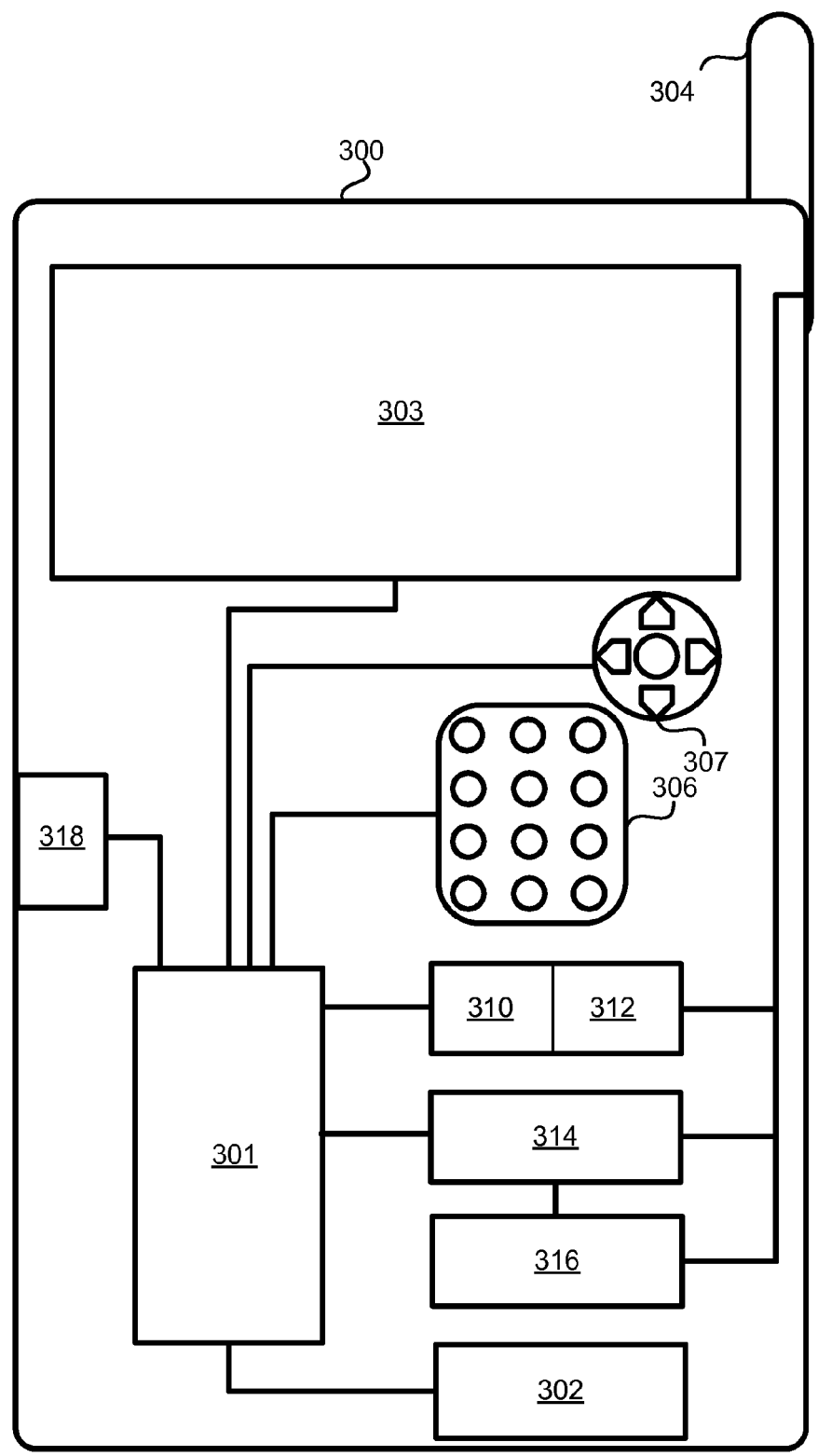
FIG. 10 is a component block diagram of a mobile device suitable for use in an embodiment.

Typical mobile devices 300 suitable for use with the various embodiments will have in common the components illustrated in FIG. 10. For example, an exemplary wireless receiver 300 may include an application processor 301 coupled to internal memory 302, and a display 303. Additionally, the mobile device 300 may have an antenna 304 for sending and receiving electromagnetic radiation that is connected to one or more wireless transceivers 310, 312, 314, 316 coupled to the application processor 301. As described above, some modem processors may be indirectly coupled to the application processors 301, as illustrated for processors 312, 316 which are coupled to the application processor 301 the processor 310 and 314, respectively. Wireless mobile device 300 typically also includes a key pad 306 or miniature keyboard and menu selection buttons or rocker switches 307 for receiving user inputs. The wireless mobile device 300 may also include a wired network interface 318, such as USB or FireWire® connector socket, for connecting to external networks and other computing devices, such as a laptop computer 12.

Figure 11:
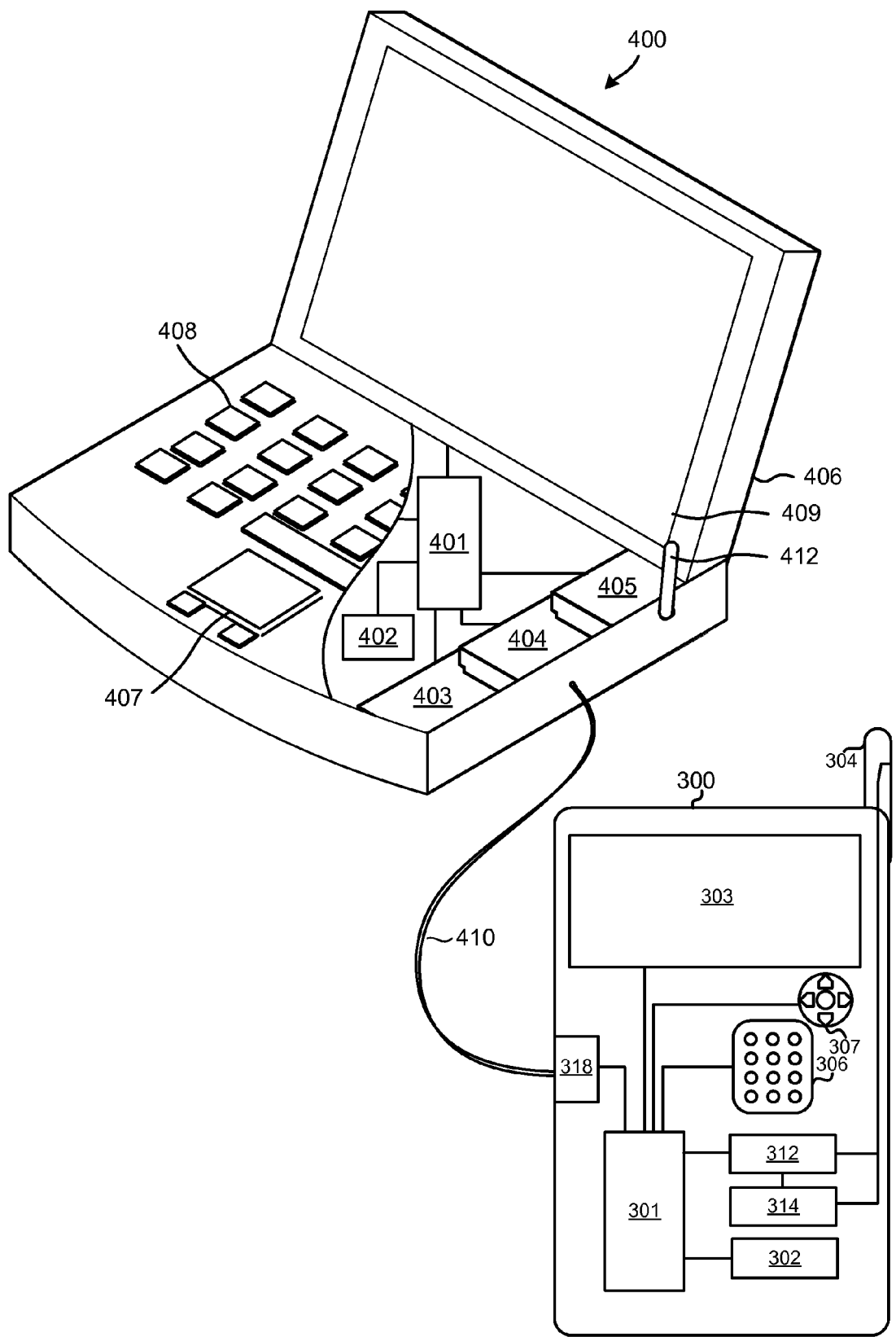
FIG. 11 is a component block diagram of a personal computer coupled to a mobile device in a configuration suitable for use in an embodiment.

The various aspects of the present invention described above may be implemented on any of a variety of mobile computing devices, such as a laptop computer 400. Typically, such computing devices will have in common the components illustrated in FIG. 11. For example, a laptop computer 400 may include a processor 402 coupled to internal memory 403 (e.g., hard disc memory) and a display 409, such as a liquid crystal display (LCD), all included within a case or housing 406. A laptop computer 400 will typically include a pointing device 407 in keyboard 408 coupled to the processor 402. The processor 401 may further be connected to a wired network interface 404, such as USB or FireWire® connector socket, for interconnecting the processor 401 with an external modem or processor via a cable 410, such as to a wireless mobile device 300 (as described above), connected to its wired network interface 318. Additionally, the laptop computer 400 may include an internal modem 405 for establishing wireless network communications, such as via an antenna 412. This internal wireless communication modem 405 may be configured according to the architecture illustrated in FIG. 2 in which the connection between the processor 401 and the modem 405 is the internal interconnect 24.

The various processors 301, 310, 312, 314, 316, 401 may be any programmable microprocessor, microcomputer or multiple processor chip or chips that can be configured by software instructions (applications) to perform a variety of functions, including the functions of the various embodiments described herein. In some mobile devices, multiple processors 301, 310, 312, 314, 316, 401 may be provided, such as one processor dedicated to wireless communication functions and one processor dedicated to running other applications. Typically, software applications may be stored in the internal memory 302, 402 before they are accessed and loaded into the processor 301. In some mobile devices, the processor 301, 310, 312, 314, 316, 401 may include internal memory sufficient to store the application software instructions. In many computing devices 300, 400, the internal memory 302, 402 may be a volatile or nonvolatile memory, such as flash memory, or a mixture of both. For the purposes of this description, a general reference to memory refers to all memory accessible by the processor 301, 310, 312, 314, 316, 401, including internal memory 302, 402 removable memory plugged into the wireless receiver 300, 400, and memory within the processor 301, 310, 312, 314, 316, 401 itself.

The various embodiments provide a number of benefits for computing devices. Any computer architecture or processor apology can be supported using a single distributed implementation of the hierarchical routing algorithm. Applications may reside on any processor within the computing device, and may be able to access networks via any other processor without requiring the application to know the proximity of the network radio. Existing applications do not need to be changed, rewritten or reintegrated in order to adapt to new emerging network technologies and computing device architectures. Device manufacturers can add additional network capabilities by adding new modems without significantly impacting existing network and communication applications. Processors from different manufacturers can be combined and joined together for faster device integration and quicker time-to-market implementation of new communication technologies. All of these benefits are in addition to the significant savings in application development time enabled by freeing the application developer from having to keep track of and manage network interfaces within a complex computing device.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in hardware, the functionality may be implemented within circuitry of a wireless signal processing circuit that may be suitable for use in a wireless receiver/transceiver or mobile device. Such a wireless signal processing circuit may include circuits for accomplishing the signal measuring and calculating steps described in the various embodiments. If implemented in software, the functions may be stored on or transmitted over as one or more instructions or code on a processor-readable medium. The steps of a method or algorithm disclosed herein may be embodied in a processor-executable software module which may reside on a processor-readable storage medium. A storage media may be any available tangible storage media that may be accessed by a processor or computer. By way of example, and not limitation, such processor-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a processor or computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of processor-readable media. Additionally, the operations of a method or algorithm may reside as one or any combination or set of codes and/or instructions on a machine readable storage medium and/or processor-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for selecting a network connection for an application running on a first processor within a computing device, comprising:

receiving, in the first processor, request from the application to connect to a network, wherein the request from the application includes network selection policy parameters comprising at least one of a technology preference, a data rate requirement, a quality of service, and a desired network capability; and performing a hierarchical interface selection procedure among a plurality of processors, wherein the hierarchical interface selection procedure comprises:

enumerating a list of available real interfaces on the first processor;

enumerating a list of available remote processors directly coupled to the first processor, wherein each of the available remote processors is associated with at least one proxy interface representing a network interface on that remote processor;

receiving in the first processor, from each available remote processor through at least one of the proxy interfaces, information about a selected best network interface available on that remote processor, wherein the selected best network interface is based on an interface match index I computed for each of the available network interfaces on that remote processor;

evaluating how well each available real interface on the first processor satisfies the network selection policy parameters by computing an interface match index I for each of the available real interfaces; and selecting a highest matching network interface associated with a largest interface match index I corresponding to the network selection policy parameters from among the available real interfaces and proxy interfaces.

2. The method of claim 1, wherein the hierarchical interface selection procedure further comprises:
forwarding the request from the application to at least one of the available remote processors via at least one proxy interface.

3. The method of claim 2, wherein the hierarchical interface selection procedure further comprises initiating a network configuration for the selected highest matching network interface.

4. The method of claim 3, wherein the application or a connection manager initiates the network configuration for the selected highest matching network interface.

5. The method of claim 3, wherein initiating the network configuration for the selected highest matching network interface comprises:
determining whether the selected highest matching network interface is an interface available on the first processor or on one of the available remote processors;
initiating a standard network configuration in response to determining that the selected highest matching network interface is an interface available on the first processor; and
automatically connecting a data path to the selected highest matching network interface in response to determining that the selected highest matching network interface is available on one of the available remote processors.

6. The method of claim 5, wherein automatically connecting a data path to the selected highest matching network interface in response to determining that the selected highest matching network interface is available on one of the available remote processors comprises:
binding a proxy interface of the first processor to a corresponding interface on the one of the available remote processors; and
binding the corresponding interface on the one of the available remote processors to the selected highest matching network interface.

7. The method of claim 6, wherein binding a proxy interface of the first processor to a corresponding interface on the one of the available remote processors comprises binding a series of interfaces across multiple processors between the proxy interface and the corresponding interface on the one of the available remote processors.

8. The method of claim 6, wherein the proxy interface is used by a peripheral device.

9. The method of claim 8, wherein the peripheral device is a laptop computer.

10. The method of claim 2, further comprising:
receiving the forwarded network interface selection request in each available remote processor via the at least one proxy interface;
computing, on each available remote processor, the interface match index I for each available network interface on that remote processor;
selecting, on each available remote processor, a best available network interface for the application request based upon the interface match index I computed for each available network interface; and
sending to the first processor, from each available remote processor, the information about the selected best network interface available on that remote processor.

11. The method of claim 10, further comprising:
forwarding the network interface selection request from a first remote processor to at least one secondary remote processor coupled to the first remote processor, wherein the first remote processor comprises an available remote processor coupled to the first processor; and
receiving in the first remote processor, from each available secondary remote processor, information about a selected best network interface available on that secondary remote processor,
wherein selecting the best available network interface for the application request on the first remote processor is further based upon the information about a selected best network interface received from each available secondary remote processor.

12. The method of claim 10, further comprising binding a proxy interface on the first remote processor to the selected best network interface on one of the available secondary remote processors.

13. The method of claim 12, wherein the one of the available secondary remote processors has another proxy interface established with the first remote processor.

14. A mobile device, comprising:
a first processor;
a memory coupled to the first processor; and
a wireless receiver circuit coupled to the first processor and configured to receive signals from a wireless communication network,
wherein the first processor is configured with processor-executable instructions to perform operations comprising:
receiving a request from an application to connect to a network, wherein the request from the application includes network selection policy parameters comprising at least one of a technology preference, a data rate requirement, a quality of service, and a desired network capability; and
performing a hierarchical interface selection procedure among a plurality of processors, wherein the hierarchical interface selection procedure comprises:
enumerating a list of available real interfaces on the first processor;
enumerating a list of available remote processors directly coupled to the first processor, wherein each of the available remote processors is associated with at least one proxy interface representing a network interface on that remote processor;
receiving, from each available remote processor through at least one of the proxy interfaces, information about a selected best network interface available on that remote processor, wherein the selected best network interface is based on an interface match index I computed for each of the available network interfaces on that remote processor;
evaluating how well each available real interface on the first processor satisfies the network selection policy parameters by computing an interface match index I for each of the available real interfaces; and
selecting a highest matching network interface associated with a largest interface match index I corresponding to the network selection policy parameters from among the available real interfaces and proxy interfaces.

15. The mobile device of claim 14, wherein the first processor is configured with processor-executable instructions to perform operations such that the hierarchical interface selection procedure further comprises:

forwarding the request from the application to at least one of the available remote processors via at least one proxy interface.

16. The mobile device of claim 15, wherein the first processor is configured with processor-executable instructions to perform operations such that the hierarchical interface selection procedure further comprises initiating a network configuration for the selected highest matching network interface.

17. The mobile device of claim 16, wherein the first processor is configured with processor-executable instructions to perform operations such that the application or a connection manager initiates the network configuration for the selected highest matching network interface.

18. The mobile device of claim 16, wherein the first processor is configured with processor-executable instructions to perform operations such that initiating the network configuration for the selected highest matching network interface comprises:
   determining whether the selected highest matching network interface is an interface available on the first processor or on one of the available remote processors;
   initiating a standard network configuration in response to determining that the selected highest matching network interface is an interface available on the first processor; and
   automatically connecting a data path to the selected highest matching network interface in response to determining that the selected highest matching network interface is available on one of the available remote processors.

19. The mobile device of claim 18, wherein the first processor is configured with processor-executable instructions to perform operations such that automatically connecting a data path to the selected highest matching network interface in response to determining that the selected highest matching network interface is available on one of the available remote processors comprises:
   binding a proxy interface of the first processor to a corresponding interface on the one of the available remote processors; and
   binding the corresponding interface on the one of the available remote processors to the selected highest matching network interface.

20. The mobile device of claim 19, wherein the first processor is configured with processor-executable instructions to perform operations such that binding a proxy interface of the first processor to a corresponding interface on the one of the available remote processors comprises binding a series of interfaces across multiple processors between the proxy interface and the corresponding interface on the one of the available remote processors.

21. The mobile device of claim 19, wherein the first processor is configured with processor-executable instructions to perform operations such that the proxy interface is used by a peripheral device.

22. The mobile device of claim 21, wherein the peripheral device is a laptop computer.

23. The mobile device of claim 15, wherein each available remote processor is configured with processor-executable instructions to perform operations comprising:
   receiving the forwarded network interface selection request from the first processor via the at least one proxy interface;
   computing the interface match index I for each available network interface on that remote processor;
   selecting a best available network interface for the application request based upon the interface match index I computed for each available network interface; and
   sending to the first processor the information about the selected best network interface available.

24. The mobile device of claim 23, wherein a first remote processor of the at least one available remote processor coupled to the first processor is configured with processor-executable instructions to perform operations further comprising:
   forwarding the network interface selection request to at least one available secondary remote processor coupled to the first remote processor; and
   receiving, from each available secondary remote processor, information about a selected best network interface available on that secondary remote processor,
   wherein the first remote processor is configured with processor-executable instructions to perform operations such that selecting the best available network interface for the application request on the first remote processor is further based upon the information about a selected best network interface received from each available secondary remote processor.

25. The mobile device of claim 23, wherein the first remote processor is configured with processor-executable instructions to perform operations further comprising binding a proxy interface on the first remote processor to the selected best network interface on one of the available secondary remote processors.

26. The mobile device of claim 25, wherein the one of the available secondary remote processors has another proxy interface established with the first remote processor.

27. A mobile device, comprising:
   means for receiving in a first processor, a request from an application to connect to a network, wherein the request from the application includes network selection parameters comprising at least one of technology preference, a data rate requirement, a quality of service, and a desired network capability; and
   means for performing a hierarchical interface selection procedure among a plurality of processors, wherein means for performing the hierarchical interface selection procedure comprises:
      means for enumerating a list of available real interfaces on the first processor;
      means for enumerating a list of available remote processors directly coupled to the first processor, wherein each of the available remote processors is associated with at least one proxy interface representing a network interface on that remote processor;
      means for receiving, from each available remote processor through at least one of the proxy interfaces, information about a selected best network interface available on that remote processor, wherein the selected best network interface is based on an interface match index I computed for each of the available network interfaces on that remote processor;
      means for evaluating how well each available real interface on the first processor satisfies the network selection policy parameters by computing an interface match index I for each of the available real interfaces; and
      means for selecting a highest matching network interface associated with a largest interface match index I corresponding to the network selection policy parameters from among the available real interfaces and proxy interfaces.

28. The mobile device of claim 27, wherein means for performing the hierarchical interface selection procedure further comprises:
  means for forwarding the request from the application to at least one of the available remote processors via at least one proxy interface.

29. The mobile device of claim 28, wherein means for performing the hierarchical interface selection procedure further comprises means for initiating a network configuration for the selected highest matching network interface.

30. The mobile device of claim 29, wherein the application or a connection manager initiates the network configuration for the selected highest matching network interface.

31. The mobile device of claim 29, wherein means for initiating the network configuration for the selected highest matching network interface comprises:
  means for determining whether the selected highest matching network interface is an interface available on the first processor or on one of the available remote processors;
  means for initiating a standard network configuration in response to determining that the selected highest matching network interface is an interface available on the first processor; and
  means for automatically connecting a data path to the selected highest matching network interface in response to determining that the selected highest matching network interface is available on one of the available remote processors.

32. The mobile device of claim 31, wherein means for automatically connecting a data path to the selected highest matching network interface in response to determining that the selected highest matching network interface is available on one of the available remote processors comprises:
  means for binding a proxy interface of the first processor to a corresponding interface on the one of the available remote processors; and
  means for binding the corresponding interface on the one of the available remote processors to the selected highest matching network interface.

33. The mobile device of claim 32, wherein means for binding a proxy interface of the first processor to a corresponding interface on the one of the available remote processors comprises binding a series of interfaces across multiple processors between the proxy interface and the corresponding interface on the one of the available remote processors.

34. The mobile device of claim 32, wherein the proxy interface is used by a peripheral device.

35. The mobile device of claim 34, wherein the peripheral device is a laptop computer.

36. The mobile device of claim 28, further comprising:
  means for receiving the forwarded network interface selection request in each available remote processor via the at least one proxy interface;
  means for computing, on each available remote processor, the interface match index I for each available network interface on that remote processor;
  means for selecting, on each available remote processor, a best available network interface for the application request based upon the interface match index I computed for each available network interface; and
  means for sending to the first processor, from each available remote processor, the information about the selected best network interface available on that remote processor.

37. The mobile device of claim 36, further comprising:
  means for forwarding the network interface selection request from a first remote processor to at least one secondary remote processor coupled to the first remote processor, wherein the first remote processor comprises an available remote processor coupled to the first processor; and
  means for receiving in the first remote processor, from each available secondary remote processor, information about a selected best network interface available on that secondary remote processor,
  wherein means for selecting the best available network interface for the application request on the first remote processor comprises means for selecting the best available network interface based upon the information about a selected best network interface received from each available secondary remote processor and how well network interfaces available on the secondary processor satisfy the network selection policy parameters.

38. The mobile device of claim 36, further comprising means for binding a proxy interface on the first remote processor to the selected best network interface on one of the available secondary remote processors.

39. The mobile device of claim 38, wherein the one of the available secondary remote processors has another proxy interface established with the first remote processor.

40. A non-transitory processor-readable storage medium having stored thereon processor-executable instructions configured to cause a processor to perform operations comprising:
  receiving, in a first processor, a request from an application to connect to a network, wherein the-request from the application includes network selection policy parameters comprising at least one of technology preference, a data rate requirement, a quality of service, and a desired network capability; and
  performing a hierarchical interface selection procedure among a plurality of processors, wherein the hierarchical interface selection procedure comprises:
    enumerating a list of available real interfaces on the first processor;
    enumerating a list of available remote processors directly coupled to the first processor, wherein each of the available remote processors is associated with at least one proxy interface representing a network interface on that remote processor;
    receiving in the first processor, from each available remote processor through at least one of the proxy interfaces, information about a selected best network interface available on that remote processor, wherein the selected best network interface is based on an interface match index I computed for each of the available network interfaces on that remote processor;
    evaluating how well each available real interface on the first processor satisfies the network selection policy parameters by computing an interface match index I for each of the available real interfaces; and
    selecting a highest matching network interface associated with a largest interface match index I corresponding to the network selection policy parameters from among the available real interfaces and proxy interfaces.

41. The non-transitory processor-readable storage medium of claim 40, wherein the stored processor-executable instructions are configured to cause the processor to perform operations such that the hierarchical interface selection procedure further comprises:
  forwarding the request from the application to at least one of the available remote processors via at least one proxy interface.

42. The non-transitory processor-readable storage medium of claim 41, wherein the stored processor-executable instructions are configured to cause the processor to perform operations such that performing the hierarchical interface selection procedure further comprises initiating a network configuration for the selected highest matching network interface.

43. The non-transitory processor-readable storage medium of claim 42, wherein the stored processor-executable instructions are configured to cause the processor to perform operations such that the application or a connection manager initiates network configuration for the selected highest matching network interface.

44. The non-transitory processor-readable storage medium of claim 42, wherein the stored processor-executable instructions are configured to cause the processor to perform operations such that initiating the network configuration for the selected highest matching network interface comprises:
  determining whether the selected highest matching network interface is an interface available on the first processor or on one of the available remote processors;
  initiating a standard network configuration in response to determining that the selected highest matching network interface is an interface available on the first processor; and
  automatically connecting a data path to the selected highest matching network interface in response to determining that the selected highest matching network interface is available on one of the available remote processors.

45. The non-transitory processor-readable storage medium of claim 44, wherein the stored processor-executable instructions are configured to cause the processor to perform operations such that automatically connecting a data path to the selected highest matching network interface in response to determining that the selected highest matching network connection is available on one of the available remote processors comprises:
  binding a proxy interface of the first processor to a corresponding interface on the one of the available remote processors; and
  binding the corresponding interface on the one of the available remote processors to the selected highest matching network interface.

46. The non-transitory processor-readable storage medium of claim 45, wherein the stored processor-executable instructions are configured to cause the processor to perform operations such that binding a proxy interface of the first processor to a corresponding interface on the one of the available remote processors comprises binding a series of interfaces across multiple processors between the proxy interface and the corresponding interface on the one of the available remote processors.

47. The non-transitory processor-readable storage medium of claim 45, wherein the stored processor-executable instructions are configured to cause the processor to perform operations such that the proxy interface is used by a peripheral device.

48. The non-transitory processor-readable storage medium of claim 47, wherein the stored processor-executable instructions are configured to cause the processor to perform operations such that the peripheral device is a laptop computer.

49. The non-transitory processor-readable storage medium of claim 41, wherein the stored processor-executable instructions are configured to cause the processor to perform operations further comprising:
  receiving the forwarded network interface selection request in each available remote processor via the at least one proxy interface;
  computing, on each available remote processor, the interface match index I for each available network interface on that remote processor;
  selecting, on each available remote processor, a best available network interface for the application request based upon the interface match index I computed for each available network interface; and
  sending to the first processor, from each available remote processor, the information about the selected best network interface available on that remote processor.

50. The non-transitory processor-readable storage medium of claim 49, wherein the stored processor-executable instructions are configured to cause the processor to perform operations further comprising:
  forwarding the network interface selection request from a first remote processor to at least one secondary remote processor coupled to the first remote processor, wherein the first remote processor comprises an available remote processor coupled to the first processor; and
  receiving in the first remote processor, from each available secondary remote processor, information about a selected best network interface available on that secondary remote processor,
  wherein the stored processor-executable instructions are configured to cause a processor to perform operations such that selecting the best available for the application request on the first remote processor is further based upon the information about a selected best network interface received from each available secondary remote processor.

51. The non-transitory processor-readable storage medium of claim 49, wherein the stored processor-executable instructions are configured to cause the processor to perform operations further comprising binding a proxy interface on the first remote processor to the selected best network interface on one of the available secondary remote processor.

52. The non-transitory processor-readable storage medium of claim 51, wherein the stored processor-executable instructions are configured to cause the processor to perform operations such that the one of the available secondary remote processors has another proxy interface established with the first remote processor.

53. A method for selecting a network connection for an application running on a first processor within a computing device, comprising:
  receiving, in the first processor, a request from the application to connect to a network, wherein the request from the application includes network selection policy parameters comprising at least one of a technology preference, a data rate requirement, a quality of service, and a desired network capability; and
  performing a hierarchical interface selection procedure among a plurality of processors, wherein the hierarchical interface selection procedure comprises:
    enumerating a list of available real interfaces on the first processor;
    enumerating a list of available remote processors directly coupled to the first processor, wherein each of the available remote processors is associated with at least one proxy interface representing a network interface on that remote processor;
    receiving in the first processor, from each available remote processor through at least one of the proxy interfaces, information about a selected best network interface available on that remote processor, wherein the selected best network interface is based on an interface match index I computed for each of the available network interfaces on that remote processor;

evaluating how well each available real interface on the first processor satisfies the network selection policy parameters by computing an interface match index I for each of the available real interfaces; and selecting a highest matching network interface associated with a largest interface match index I corresponding to the network selection policy parameters from among the available real interfaces and proxy interfaces; and initiating a network configuration for the selected network interface best matching the network selection policy parameters, wherein initiating the network configuration comprises:

determining whether the selected network interface best matching the network selection policy parameters is an interface available on the first processor or on one of the available remote processors; and automatically connecting a data path to the selected network interface best matching the network selection policy parameters in response to determining that the selected network interface is available on one of the available remote processors.

* * * * *